(12) United States Patent
Li (10) Patent No.: US 10,500,484 B2
(45) Date of Patent: Dec. 10, 2019

(54) INFORMATION PROCESSING METHOD AND APPARATUS, STORAGE MEDIUM, AND ELECTRONIC DEVICE

(71) Applicant: NETEASE (HANGZHOU) NETWORK CO., LTD., Zhejiang (CN)

(72) Inventor: Xuemei Li, Zhejiang (CN)

(73) Assignee: NETEASE (HANGZHOU) NETWORK CO., LTD., Zhejiang (CN)

(*) Notice: Subject to any disclaimer, the term of this patent is extended or adjusted under 35 U.S.C. 154(b) by 0 days.

(21) Appl. No.: 16/106,079

(22) Filed: Aug. 21, 2018

(65) Prior Publication Data

US 2019/0118078 A1 Apr. 25, 2019

(30) Foreign Application Priority Data

Oct. 23, 2017 (CN) .......................... 2017 1 0995251

(51) Int. Cl.
*A63F 13/00* (2014.01)
*A63F 13/2145* (2014.01)
*A63F 13/5375* (2014.01)
*A63F 13/92* (2014.01)
*A63F 13/426* (2014.01)
(Continued)

(52) U.S. Cl.
CPC ........ *A63F 13/2145* (2014.09); *A63F 13/426* (2014.09); *A63F 13/5375* (2014.09); *A63F 13/92* (2014.09); *G06F 3/04845* (2013.01); *G06F 3/04886* (2013.01); *G06F 2203/04804* (2013.01)

(58) Field of Classification Search
None
See application file for complete search history.

(56) References Cited

U.S. PATENT DOCUMENTS 8,675,019 B1* 3/2014 Feinstein ............... G09G 5/026
345/634
2005/0110768 A1* 5/2005 Marriott .............. G06F 3/03547
345/173
(Continued)

FOREIGN PATENT DOCUMENTS

CN 104436657 A 3/2015
CN 106527924 A 3/2017
(Continued)

*Primary Examiner* — Paul A D'Agostino
(74) *Attorney, Agent, or Firm* — Gang Yu (57) ABSTRACT

An information processing method and apparatus, a storage medium, and an electronic device are provided. The method includes that: a motion control is provided in a graphical user interface, a first touch operation acting on the motion control is detected, and a virtual character is controlled to move in a game scene according to a movement of a touch point of the first touch operation; an orientation control area is provided, a second touch operation acting on the orientation control area is detected, and an orientation of the virtual character in the game scene is adjusted according to a movement of a touch point of the second touch operation; and a perspective control is provided, a third touch operation acting on the perspective control is detected, and a presentation perspective of the game scene is adjusted according to the third touch operation.

20 Claims, 2 Drawing Sheets

(51) Int. Cl.
  *G06F 3/0488* (2013.01)
  *G06F 3/0484* (2013.01)

(56) References Cited

U.S. PATENT DOCUMENTS

| | | | | | |
|---|---|---|---|---|---|
| 2007/0238529 | A1* | 10/2007 | Iwamoto | | H04W 4/60 463/42 |
| 2008/0146328 | A1* | 6/2008 | Ishii | | A63F 13/10 463/31 |
| 2011/0256912 | A1* | 10/2011 | Baynes | | A63F 13/803 463/6 |
| 2011/0273473 | A1* | 11/2011 | Kim | | G06T 19/00 345/629 |
| 2012/0007854 | A1* | 1/2012 | Cho | | G06F 3/04883 345/419 |
| 2012/0194461 | A1* | 8/2012 | Lim | | G06F 3/03547 345/173 |
| 2012/0223894 | A1* | 9/2012 | Zhao | | G06F 3/0488 345/173 |
| 2013/0127980 | A1* | 5/2013 | Haddick | | G06F 3/013 348/14.08 |
| 2014/0066200 | A1 | 3/2014 | Matsui et al. | | |
| 2014/0191977 | A1* | 7/2014 | Feng | | G06F 3/018 345/173 |
| 2014/0243089 | A1* | 8/2014 | Tsukioka | | A63F 13/12 463/31 |
| 2014/0245367 | A1* | 8/2014 | Sasaki | | H04N 21/4402 725/109 |
| 2014/0368441 | A1* | 12/2014 | Touloumtzis | | G06F 3/017 345/173 |
| 2014/0379946 | A1* | 12/2014 | Zhang | | G06F 3/038 710/67 |
| 2016/0059131 | A1* | 3/2016 | Ye | | A63F 13/537 463/31 |

FOREIGN PATENT DOCUMENTS

| | | |
|---|---|---|
| CN | 106975219 A | 7/2017 |
| CN | 107132979 A | 9/2017 |
| CN | 107132988 A | 9/2017 |
| EP | 2329868 A1 | 6/2011 |
| EP | 2860687 A1 | 4/2015 |
| JP | 2011141632 A | 7/2011 |

* cited by examiner

INFORMATION PROCESSING METHOD AND APPARATUS, STORAGE MEDIUM, AND ELECTRONIC DEVICE

CROSS-REFERENCE TO RELATED APPLICATIONS

The present disclosure claims priority of Chinese Patent Application No. 201710995251.1, filed to China Patent Office on Oct. 23, 2017. Contents of the present disclosure are hereby incorporated by reference in entirety of the Chinese Patent Application.

TECHNICAL FIELD

The present disclosure relates to the technical field of games, and in particular to an information processing method and apparatus, a storage medium, and an electronic device.

BACKGROUND

Under the wave of the Internet, continuous development and evolution of hardware and software technologies has promoted emergence of smart devices and software. At the same time, a large number of mobile games with different themes emerged to meet different needs of users.

However, for a mobile terminal running a mobile game, a player usually controls a virtual character in a game by thumbs of two hands. And due to the limitation of control, game experience of the player is limited. Especially for heavy control games, it is difficult for the player to realize control and switching of movement, orientation, and view of the virtual character at the same time or within a very short time period.

SUMMARY

At least some embodiments of the present disclosure provide an information processing method and apparatus, a storage medium, and an electronic device.

In one embodiment of the present disclosure, an information processing method is applied to a mobile terminal having at least one processor for executing a software application and a touch screen which is rendered with and a graphical user interface, contents rendered on the graphical user interface at least partially include a game scene and a virtual character. The method includes that: providing a motion control on the graphical user interface, detecting a first touch operation acting on the motion control, and controlling the virtual character to move in the game scene according to a movement of a touch point of the first touch operation; providing an orientation control area on the graphical user interface, detecting a second touch operation acting on the orientation control area, and adjusting an orientation of the virtual character in the game scene according to a movement of a touch point of the second touch operation; and providing a perspective control on the graphical user interface, detecting a third touch operation acting on the perspective control, and adjusting a presentation view of the game scene according to the third touch operation.

In another embodiment of the present disclosure, an information processing apparatus is applied to a mobile terminal having at least one processor for executing a software application and a touch screen which is rendered with and a graphical user interface, contents rendered on the graphical user interface at least partially include a game scene and a virtual character. The apparatus includes:

a first control element, configured to provide a motion control on the graphical user interface, detect a first touch operation acting on the motion control, and control the virtual character to move in the game scene according to a movement of a touch point of the first touch operation; a second control element, configured to provide an orientation control area on the graphical user interface, detect a second touch operation acting on the orientation control area, and adjust an orientation of the virtual character in the game scene according to a movement of a touch point of the second touch operation; and a third control element, configured to provide a perspective control on the graphical user interface, detect a third touch operation acting on the perspective control, and adjust a presentation view of the game scene according to the third touch operation.

In another embodiment of the present disclosure, a computer-readable storage medium is provided, on which at least one computer program is stored, and the at least one computer program is executed by at least one processor to implement the above information processing method.

In another embodiment of the present disclosure, an electronic device is provided. The electronic device includes:

at least one processor, and a display apparatus; and at least one memory, configured to store at least one executable instruction of the processor, and the at least one processor is configured to execute the above information processing method by executing the at least one executable instruction.

DETAILED DESCRIPTION

It should be noted that the embodiments in the present application and the features in the embodiments may be combined with each other without conflict. The present disclosure will be described in detail below with reference to the drawings in conjunction with the embodiments.

Figure 1:
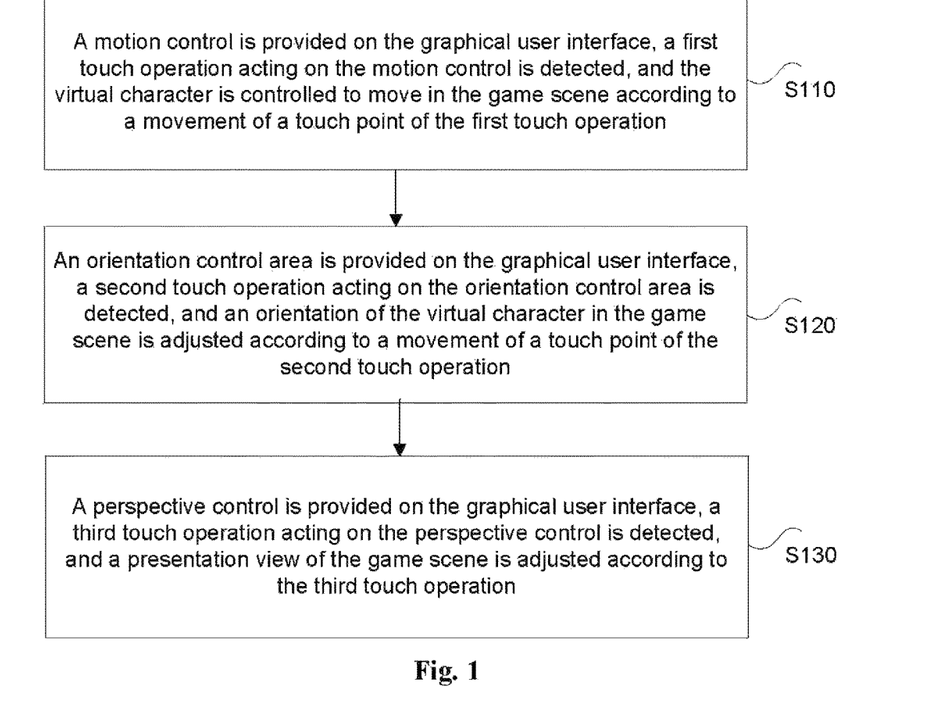
FIG. 1 is a flowchart of an information processing method according to an embodiment of the present disclosure.

In an embodiment of the present disclosure, an information processing method is provided. And an executed object of this method may be any terminal device such as a computer, a tablet computer, a mobile terminal, or an electronic device. This method is applied to a mobile terminal having at least one processor for executing a software application and a touch screen which is rendered with and a graphical user interface, contents rendered on the graphical user interface at least partially include a game scene and a virtual character. FIG. 1 is a flowchart of an information processing method according to an embodiment of the present disclosure. As shown in FIG. 1, in the present embodiment, the method includes the steps as follows.

At step S110, a motion control is provided on the graphical user interface, a first touch operation acting on the motion control is detected, and the virtual character is controlled to move in the game scene according to a movement of a touch point of the first touch operation.

At step S120, an orientation control area is provided on the graphical user interface, a second touch operation acting on the orientation control area is detected, and an orientation of the virtual character in the game scene is adjusted according to a movement of a touch point of the second touch operation.

At step S130, a perspective control is provided on the graphical user interface, a third touch operation acting on the perspective control is detected, and a presentation view of the game scene is adjusted according to the third touch operation.

Through providing the motion control on the graphical user interface, the virtual character is controlled to move in the game scene according to the movement of the touch point of the first touch operation. Through providing the orientation control area, the orientation of the virtual character in the game scene is adjusted according to the movement of the touch point of the second touch operation. And through further providing the perspective control, the presentation view of the game scene is adjusted according to the third touch operation. Control areas of three control modes are disposed at appropriate positions on the graphical user interface, and organic cooperation of the three control modes solves the technical problem of difficulty for a player to realize the control and switching of the movement, orientation, and view of the virtual character at the same time or within a very short time period, so that it is more convenient for the player to control a game, thereby effectively improving the user experience.

In an optional embodiment, a software application is executed on a processor of a mobile terminal, and rendering a graphical user interface is performed on a touch display screen of the mobile terminal. Contents displayed by the graphical user interface at least partially include a game scene and a virtual character.

Contents presented by the graphical user interface may include the entire part of the game scene, and may also be part of the game scene. For example, when a game scene is relatively large, local content of the game scene is displayed on a graphical user interface of a mobile terminal during the game. A shape of the game scene may be a square shape or other shapes (e.g., circles, etc.). The game scene may include ground, mountains, rocks, flowers, grass, trees, buildings, and the like.

Contents presented by the graphical user interface may include the entire part of the virtual character or the local part of the virtual character. For example, in a third person perspective game, contents presented by the graphical user interface may include the entire part of the virtual character. For another example, in a first person perspective game, contents presented by the graphical user interface may include part of the virtual character.

In an optional embodiment, the graphical user interface includes a mini-map. The mini-map may be a thumbnail of the entire game scene, or may be a thumbnail of a local part of the game scene. Different details may be displayed in the mini-map for different types of games (e.g. details of maps that may be used for assisting players in determining positions of virtual characters controlled by the players in the game world, real-time positions of ally virtual characters controlled by teammates, real-time positions of enemy virtual characters, vision information of the current game scene, etc.). The mini-map may be displayed at the upper left, upper right, or other positions on the graphical user interface. The present exemplary embodiment is not limited to the displayed position of the mini-map.

At step S110, a motion control is provided on the graphical user interface, and the virtual character is configured to move in the game scene according to a first touch operation received in the motion control. The motion control may be a virtual joystick, a direction control virtual button or the like, and the present exemplary embodiment does not specially define this.

In an optional embodiment, the motion control is a virtual joystick, and the virtual character is controlled to move in the game scene according to the first touch operation received in the virtual joystick.

In an optional embodiment, the motion control is a virtual cross button or a virtual D-PAD button. The virtual character is controlled to move in the game scene according to the first touch operation received in the virtual cross button.

In an optional embodiment, the motion control is a visible control, such as a touch operation control having a bounding box, or a touch operation control filled with at least one color, or a touch operation control having a predetermined transparency, or other operation controls capable of visually indicating the range of the motion control. The virtual character is controlled to move in the game scene according to a touch operation such as a sliding operation or a click operation received in the touch operation control. The touch operation control, which is set as the visible control, can quickly make a user position the touch operation control, and an operation difficulty of a game novice can be reduced.

In an optional embodiment, the motion control is an invisible control on the graphical user interface. The touch operation control, which is set as the invisible control, may not cover or affect a game screen, can provide a better screen effect, can save a screen space, and is applicable to an operation of a game master.

In an optional embodiment, controlling the virtual character to move in the game scene refers to: controlling a moving direction of the virtual character in the game scene, so as to make the position of the virtual character in the game scene changed; or, controlling a moving direction and a moving speed of the virtual character in the game scene, so as to make the position of the virtual character in the game scene changed at the moving speed.

Through providing the motion control on the graphical user interface, the first touch operation acting on the motion control is detected, and the virtual character is controlled to move in the game scene according to the movement of the touch point of the first touch operation.

At step S120, an orientation control area is provided on the graphical user interface, and an orientation of the virtual character in the game scene screen is adjusted according to a second touch operation received in the orientation control area.

The orientation control area may be, for example, a virtual joystick area, a direction control virtual button or other different modes.

In an optional embodiment, the orientation control area is a virtual joystick area, and the orientation of the virtual character in the game scene screen is adjusted according to the second touch operation received in the virtual joystick area.

In an optional embodiment, the orientation control area is a virtual cross button area or a virtual D-PAD button area. The orientation of the virtual character in the game scene screen is adjusted according to the second touch operation received in the virtual cross button area.

In an optional embodiment, the orientation control area is a visible area, such as a touch operation area having a bounding box, or a touch operation area filled with at least one color, or a touch operation area having a predetermined transparency, or other operation areas capable of visually indicating a range of a second touch operation area. The virtual character is controlled to execute at least one of displacement operation and rotation operation in the game scene according to a touch operation such as a sliding operation or a click operation received in the touch operation area. The touch operation area, which is set as the visible area, can quickly make a user position the touch operation area, and an operation difficulty of a game novice can be reduced.

In an optional embodiment, the orientation control area is an invisible area on the graphical user interface. The touch operation area, which is set as the invisible area, may not cover or affect a game screen, can provide a better screen effect, can save a screen space, and is applicable to the operation of a game master.

Adjusting the orientation of the virtual character in the game scene refers to changing a current orientation of the virtual character in the game scene. It should be noted that the meaning of the orientation of the virtual character in the game scene is different from the meaning of the moving direction. The orientation and moving direction of the virtual character in the game scene are either independent of each other or may be superimposed on each other. For example, an orientation of a virtual character A in the game scene is controlled to be north, and meanwhile, the virtual character A is controlled to move at a preset speed V1 and move in the west direction, thereby realizing the performance effect of the virtual character A in the game scene. And the effect is that the virtual character A takes the north direction as the current orientation, and positional change occurs in the game scene with the preset speed V1 as the moving speed and the west direction as the moving direction.

Through providing the orientation control area on the graphical user interface, the second touch operation acting on the orientation control area is detected, and the orientation of the virtual character in the game scene is adjusted according to the movement of the touch point of the second touch operation.

At step S130, a perspective control is provided on the graphical user interface, and a presentation view of the game scene is adjusted according to a third touch operation. The perspective control may be a virtual joystick, a direction control virtual button or the like, and the present exemplary embodiment does not specially define this.

In an optional embodiment, the perspective control is a virtual joystick, and the presentation view of the game scene is adjusted according to the third touch operation received in the virtual joystick.

In an optional embodiment, the perspective control is a virtual cross button or a virtual D-PAD button. The presentation view of the game scene is adjusted according to the third touch operation received in the virtual cross button.

In an optional embodiment, the perspective control is a visible control, such as a touch operation control having a bounding box, or a touch operation control filled with at least one color, or a touch operation control having a predetermined transparency, or other operation controls capable of visually indicating a range of the motion control. The presentation view of the game scene is adjusted according to a touch operation such as a sliding operation or a click operation received in the touch operation control. The touch operation control, which is set as the visible control, can quickly make a user position the touch operation control, and an operation difficulty of a game novice can be reduced.

In an optional embodiment, the perspective control is an invisible control on the graphical user interface. The touch operation control, which is set as the invisible control, may not cover or affect a game screen, can provide a better screen effect, can save a screen space, and is applicable to the operation of a game master.

It should be noted that when the presentation view of the game scene is adjusted, the position and orientation of the virtual character in the game scene are kept unchanged.

Through providing the perspective control on the graphical user interface, the third touch operation acting on the perspective control is detected, and the presentation view of the game scene is adjusted according to the third touch operation.

In an optional embodiment, at step S130, an operation that the perspective control is provided on the graphical user interface includes one of the following:
the perspective control is fixedly displayed within a preset area on the graphical user interface; and
when a perspective adjustment triggering event is detected, the perspective control is displayed on the graphical user interface.

In an optional embodiment, a preset area on the graphical user interface may be preset by a system according to actual needs or may be set at a position selected by a user.

In an optional embodiment, at least one option is provided in a setting of a game software application for the user to select, and it is determined, according to a content of the at least one option, whether to provide at least one of display parameters, e.g., information such as orientation, size and transparency, of the perspective control on the graphical user interface.

In an optional embodiment, the perspective adjustment triggering event may be triggered by detecting a touch operation of a specific trigger control provided on the graphical user interface, or may be triggered according to a preset interaction condition, for example, pressing, double clicking, shaking, voice input, etc. of a user.

The fixed display of the perspective control in the preset area allows the user to quickly and accurately find the perspective control, thereby reducing the interaction time. Or, when the perspective control needs to be operated, the perspective control is called to avoid mis-operation, and the screen space can be saved. In addition, it can be determined whether to provide the perspective control on the graphical user interface according to use requirements of the user during the game. There is no need for the user to return to the settings of the game client software application to select, the game battle will not be interrupted, and other operations of the game will not be affected.

In an optional embodiment, at step S130, the operation that the presentation view of the game scene is adjusted according to the third touch operation includes the steps as follows.

At step S131, an orientation of a virtual camera corresponding to the presentation view is changed according to the third touch operation.

At step S133, the presentation view of the game scene on the graphical user interface is determined according to the orientation of the virtual camera.

It should be noted that in the first person game, the virtual camera may be the "eye" of the user in the game. The virtual camera may be disposed at the head of the virtual character and the orientation of the virtual camera rotates following the rotation of the virtual character. And contents of the game scene rendered on the display of the touch terminal are equivalent to the scene content captured by the virtual camera. In the third person game, the virtual camera may be disposed above and behind the virtual character, and all game scenes may be captured. A mapping relationship between a vector distance of the virtual joystick control and a rotation angle of the virtual camera may be set to control the virtual camera to rotate.

In an optional embodiment, when the presentation view of the game scene is adjusted according to the third touch operation, the presentation view of the game scene screen may be displayed on the graphical user interface in a first person perspective, or, the presentation view of the game scene screen may be displayed on the graphical user interface in a third person perspective.

In an optional embodiment, the third touch operation is a touch sliding operation, and the orientation of the virtual camera is changed according to a sliding track of the touch sliding operation, thereby changing the presentation view of the game scene screen on the graphical user interface by changing the orientation of the virtual camera. The adjustment rotation direction of the presentation view of the game scene screen on the graphical user interface is the same as the sliding direction.

In an optional embodiment, at step S131, an operation that the orientation of the virtual camera corresponding to the presentation perspective is changed according to the third touch operation includes the steps as follows.

At step S1311, a current position of a touch point of the third touch operation is acquired.

At step S1313, a vector between the current position and an origin position of the perspective control is determined.

At step S1315, a rotation angle of the virtual camera corresponding to the presentation view is changed according to the vector, so as to determine the orientation of the virtual camera.

The perspective control is equivalent to the virtual joystick, and the origin position is equivalent to an initial position of the virtual joystick. Under normal conditions, the origin position is presented as a geometric center position.

In an optional embodiment, the current position of the touch point of the third touch operation and the origin position of the perspective control may be acquired in real time, and a vector between the current position and the origin position is determined by a coordinate distance calculation formula. The vector here includes a direction from the origin position of the perspective control to the current position of the touch point of the third touch operation, and a distance from the origin position of the perspective control to the current position of the touch point of the third touch operation.

In an optional embodiment, the rotation angle of the virtual camera in the game scene may be adjusted correspondingly according to the calculated vector to determine a target rotation direction, and aiming at the determined target rotation, the virtual camera is controlled to rotate and to determine the target rotation direction as the current orientation of the virtual camera. The target rotation direction may be any direction of the perspective control, and the target rotation direction may be determined according to a current position of an end point of the third touch operation.

Through the above implementation manner, the rotation angle of the virtual camera is adjusted by calculating the vector, the view presentation direction may be more accurately determined, and the precision of the view operation is improved.

Figure 2:
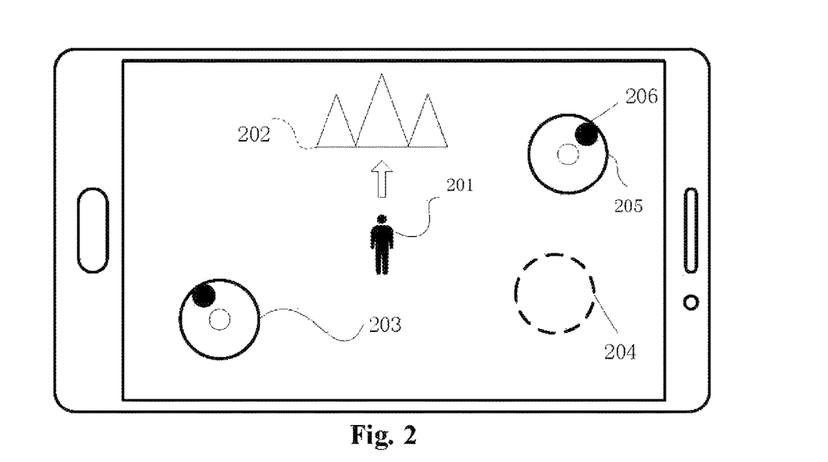
FIG. 2 is a schematic diagram of a graphical user interface according to an exemplary embodiment of the present disclosure.

In an optional embodiment, taking FIG. 2 as an example, FIG. 2 is a schematic diagram of a user performing a view changing operation in an exemplary embodiment of the present disclosure. As shown in FIG. 2, a user controls a virtual character 201 in a game scene and a current orientation of the virtual character is directed to a virtual object (peak) 202. The user may control the movement of the virtual character 201 in the game scene through a motion control 203 located on the left side of a graphical user interface, may adjust the current orientation of the virtual character 201 in the game scene through an orientation control area 204 located on the lower right side of the graphical user interface, and may change a presentation view of the game scene screen on the graphical user interface through a perspective control 205 located on the upper right side of the graphical user interface. The perspective control 205 is a virtual joystick control, and an orientation control of a virtual camera is realized by a touch operation received in a virtual joystick 206, thereby realizing the adjustment of the presentation view of the game scene screen. For example, when a finger is controlling the virtual joystick 206 to slide left and right, the game screen presents a left-right adjustment corresponding to the presentation view.

In an optional embodiment, the third touch operation is a touch sliding operation, and the orientation of the virtual camera is changed according to a sliding track of the touch sliding operation, so as to change the presentation view of the game scene screen on the graphic user interface. As shown in FIG. 2, when the finger controls the virtual joystick 206 to slide left and right, the presentation view of the game screen presents a corresponding left and right adjustment; and when the finger controls the virtual joystick 206 to slide up and down, the presentation view of the game screen presents a corresponding up and down adjustment.

In an optional embodiment, the third touch operation is a touch click operation, and the presentation view of the game scene screen on the graphical user interface is changed according to a preset point in the perspective control and the click position of the touch click operation. For one example, the preset point is a circular point of the perspective control, a click position of the touch click operation is on the right side of the circular point, and the virtual camera is controlled to rotate rightward. For another example, the preset point is the circular point of the perspective control, a click position of the touch click operation is above the circular point, and the virtual camera is controlled to move upward. Similarly, the presentation view is correspondingly changed after the touch click operation in other orientations is received.

In an optional embodiment, the adjustment direction of the presentation view of the game scene screen on the graphical user interface is opposite to the sliding direction. For example, when the finger controls the virtual joystick 206 to slide on the upper right side, the presentation view of the game screen presents a corresponding left downward adjustment.

It should be noted that in a process of adjusting the presentation view, the movement and current orientation of the virtual character are not changed. That is, the movement of the virtual character 201 is still determined according to the control of the motion control 203, and the current orientation is still determined according to the control of the orientation control area 204. Thus, it is possible to freely control the presentation view by the perspective control 205 while controlling the virtual character to perform at least one of movement and orientation change.

Through the above implementation manner, the user controls the movement and orientation of the virtual character in the game scene by the motion control 203 and the orientation control area 204. And even if the virtual character actually moves relative to the game scene, the presentation view of the game scene screen on the graphical user interface is controlled by the perspective control 205 to allow the user to freely observe the surrounding environment, but does not cause the virtual character to actually move relative to the game scene. Therefore, the operation of controlling the virtual character to actually move and the operation of adjusting the presentation perspective are independent of each other and do not affect each other, so that the technical problem of difficulty for the player to realize the control and switching of the movement, orientation, and view of the virtual character at the same time or within a very short time period is solved, and it is more convenient for the player to control a game, thereby effectively improving the user experience.

In an optional embodiment, after step S130, the method further includes the steps as follows.

At step S140, before an end triggering event of the third touch operation is detected, it is detected whether a virtual target exists at a preset position, for displaying the presentation view of the game scene, of the graphical user interface in real time.

At step S150, when the virtual target exists at the preset position, at least one interaction control is provided within a preset area on the graphical user interface according to a preset type of the virtual target, the at least one interaction control including at least one preset instruction.

At step S160, when a fourth touch operation acting on the at least one interaction control is detected, according to an interaction control selected by the fourth touch operation, instruction prompt information corresponding to the selected interaction control is sent.

In an optional embodiment, the end triggering event of the third touch operation may be triggered by detecting that a medium initiating the touch operation is separated from a specific trigger control provided on the graphical user interface, or may be triggered according to a preset interaction condition, such as modes of pressing, shaking, and voice input of a user.

In an optional embodiment, the preset position of the graphical user interface may be a geometric center of the graphical user interface, or a preset certain coordinate or region, or may be a position of a crosshair (the crosshair for aiming and shooting at a fixed position may exist on the graphical user interface in a shooting game, the crosshair being located at the geometric center of the graphical user interface usually) on the graphical user interface.

In an optional embodiment, the virtual target may include: different types of virtual characters such as at least one enemy virtual character, at least one ally virtual character, at least one building, and at least one vehicle.

In an optional embodiment, when there is the virtual target at the preset position, a preset type of the virtual target is determined, at least one interaction control corresponding to the preset type is provided within a preset area (which may be any area, or may be disposed around the preset target, or may be disposed around the motion control) on the graphical user interface according to different preset types, and the interaction control includes a preset instruction. For example, if the type of the virtual target is determined to be an ally virtual character, multiple interaction controls are provided on the graphical user interface, and each interaction control may provide different instructions, such as protection, treatment, and follow. If the type of the virtual target is determined to be an enemy virtual character, instructions for providing multiple interaction controls may be instructions such as attack, evasion, and attention. If the type of the virtual target is determined to be a building, instructions for providing multiple interaction controls may be instructions such as search, hiding, and indoor danger. And if the type of the virtual target is determined to be a vehicle, instructions for providing multiple interaction controls may be instructions such as taking (a vehicle carrying a few virtual characters), and paying attention to an enemy vehicle.

In an optional embodiment, according to the interaction control selected by the fourth touch operation, an instruction corresponding to the interaction control is determined, and instruction prompt information corresponding to the interaction control is sent to clients of teammates, and displayed on the graphical user interfaces of the clients.

Through the above implementation manner, when the user makes a free view, after the situation is found, the user does not need to enter a chat page, and may quickly provide information prompts for the teammates by selecting a control, thereby greatly shortening the quick information interaction process with the teammates during battle, and effectively improving the smoothness of the game experience.

Figure 3:
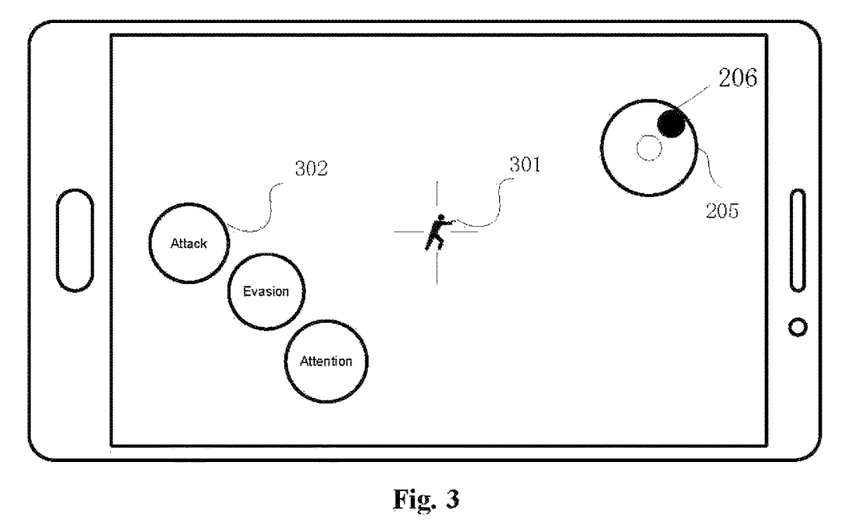
FIG. 3 is a schematic diagram of information interaction of users during a perspective change operation according to an exemplary embodiment of the present disclosure.

In an optional embodiment, taking FIG. 3 as an example, FIG. 3 is a schematic diagram of information interaction of a user during a view changing operation in an exemplary embodiment of the present disclosure. As shown in FIG. 3, when the user changes the presentation view of the game scene screen on the graphical user interface through the perspective control 205, a virtual target 301 is detected at a preset position (a position of a crosshair in the present embodiment) on the graphical user interface, a preset type of the virtual target 301 is determined to be an enemy virtual character, and according to the preset type, three interaction controls 302 are provided within a preset area of the graphical user interface, respectively corresponding to different preset instructions: attack, elusion, and attention. When a fourth touch operation acting on the interaction control 302 is detected, according to the interaction control selected by the touch operation, for example, an interaction control making an instruction of attack, instruction prompt information corresponding to the interaction control is generated and sent to the client of the teammate. For example, prompt information "find at least one enemy virtual character and attack" is sent.

Through the above implementation manner, when the user makes a free view, after the situation is found, the user does not need to enter a chat page, and may quickly provide information prompts for the teammates by selecting a control, thereby greatly shortening the quick information interaction process with the teammates during battle, and effectively improving the smoothness of the game experience.

In an optional embodiment, at step S160, the operation that instruction prompt information corresponding to the selected interaction control is sent according to the interaction control selected by the fourth touch operation further includes the steps as follows.

At step S161, current position information of the virtual target is acquired.

At step S163, the instruction prompt information is generated according to the current position information of the virtual target and an instruction corresponding to the selected interaction control.

At step S165, the instruction prompt information is sent.

In an optional embodiment, the current position information of the virtual target may be absolute position information relative to the game scene, or may be relative position information relative to the virtual character (i.e., a character controlled by the player).

In an optional embodiment, the current position information corresponding to the virtual target is acquired, and a current coordinate is determined as the current position information corresponding to the virtual target by determining a current coordinate of the virtual target in the game scene. For example, the current coordinate of the virtual target in the game scene is (10, 10), and the corresponding instruction of the selected interaction control is: "find at least one enemy virtual character and attack", thus corresponding instruction prompt information: "find at least one enemy virtual character (10, 10) and attack" is generated.

In an optional embodiment, the current position information corresponding to the virtual target is acquired, and a ray may be emitted inward from a preset position on the graphical user interface (the ray is preset visible or invisible) to collide with a virtual object in the game scene on the graphical user interface, so as to determine the virtual target. After the virtual target is determined, an intersection point of the ray and the virtual target is searched, and a straight line is drawn vertically downward from the intersection point to the ground. The coordinate corresponding to an intersection point of the straight line and the ground is the current position information of the virtual target. For example, the current position information of the determined virtual target is (20, 20), and the corresponding instruction of the selected interactive control is: "find an enemy and hide", so corresponding instruction prompt information: "find at least one enemy virtual character (20, 20) and hide" is generated.

In an optional embodiment, the current position information corresponding to the virtual target is acquired, orientation information of the virtual target relative to the virtual character is determined, and the orientation information is used as current position information of the virtual target object. For example, the orientation information of the determined virtual target relative to the virtual character is "10° east to south", and the corresponding instruction of the selected interaction control is "find at least one enemy virtual character and pay attention", thus corresponding instruction prompt information: "find at least one enemy virtual character (10° east to south) and pay attention" is generated.

Through the above implementation manner, the position information of the virtual target is added in the prompt information, which is convenient for the teammate to quickly locate, and the time for the teammate to find the target according to the prompt information can be greatly shortened, thereby effectively improving the user experience.

In an optional embodiment, the method further includes the steps as follows.

At step S200, the instruction prompt information is received.

At step S210, current position information of the virtual target corresponding to the instruction prompt information is extracted.

At step S220, current position information of the virtual character is acquired.

At step S230, orientation information of the virtual target relative to the virtual character is determined according to the current position information of the virtual target and the current position information of the virtual character.

At step S240, the current position information of the virtual target in the instruction prompt information is replaced with the orientation information, and then the instruction prompt information is displayed.

In an optional embodiment, the instruction prompt information is sent to clients of teammates, and when the clients of the teammates receive the instruction prompt information, the instruction prompt information is displayed in a graphical user interface of the clients. Undoubtedly, the instruction prompt information sent by clients of teammates may also be received locally. And the received instruction prompt information may be directly displayed, or the instruction prompt information may be parsed and displayed. A parsing process may be: extracting current position information corresponding to the virtual target in the instruction prompt information, and converting the current position information into relative orientation information relative to the virtual character controlled by a local client. For example, the local client receives the instruction prompt information sent by a client of a teammate A: "find an enemy virtual character (10, 10) and hide", extracts the current position information (10, 10) of the virtual target, calculates, according to the current position information (assumed to be (0, 20)) of the virtual character controlled by the local client, the relative orientation information "45° north to west" relative to the virtual character controlled by the local client, and displays the converted instruction prompt information "find an enemy virtual character (45° north to west) and hide" on the graphical user interface.

Through the above implementation manner, the position information of the virtual target is added in the prompt information, and the relative orientation information of the virtual target is converted according to the current position information of the virtual character controlled by the local client, so that the teammate can quickly understand the position information in the instruction prompt information according to the orientation of the local client, the time for teammates to find the target according to the prompt information can be greatly shortened, and the user experience is effectively improved.

In an optional embodiment, after step S130, the method further includes the step as follows.

At step S170, when an end triggering event of the third touch operation is detected, the presentation view is controlled to restore to a presentation view corresponding to a current orientation of the virtual character in the game scene.

In an optional embodiment, the end triggering event of the third touch operation may be triggered by detecting that a medium initiating the touch operation is separated from a specific trigger control provided on the graphical user interface, or may be triggered according to a preset interaction condition, such as modes of pressing, shaking, and voice input of a user.

In an optional embodiment, a default presentation view is a presentation view corresponding to the current orientation of the virtual character. In the present embodiment, the presentation view restores to the presentation view corresponding to the current orientation of the virtual character in the game scenario. That is, the second presentation perspective restores to the default presentation perspective or the presentation perspective corresponding to the current orientation of the virtual character determined according to the second touch operation.

Through the above implementation manner, the user can change the direction of the presentation view of the game scene screen on the graphical user interface by using the third touch operation, and does not change the orientation and the moving direction of the virtual character. After the third touch operation ends, the game screen presented on the terminal can be quickly restored. A convenient and fast view adjustment mode is provided.

Figure 4:
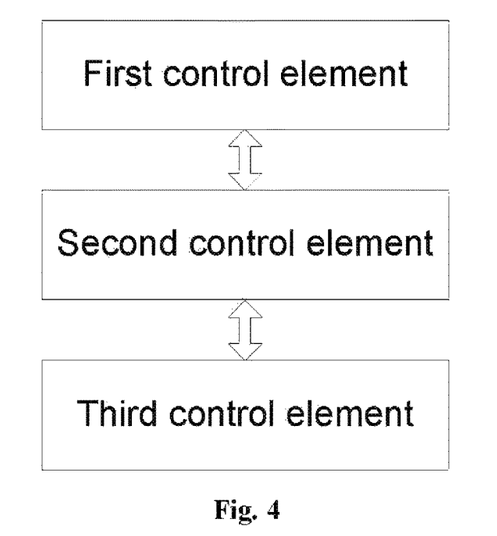
FIG. 4 is a composition diagram of an information processing apparatus according to an embodiment of the present disclosure.

In the present exemplary embodiment, an information processing apparatus is also applied to a mobile terminal having at least one processor for executing a software application and a touch screen which is rendered with and a graphical user interface, contents rendered on the graphical user interface at least partially include a game scene and a virtual character. FIG. 4 is a composition diagram of an information processing apparatus according to the present exemplary embodiment. As shown in FIG. 4, the apparatus includes:

a first control element, configured to provide a motion control on the graphical user interface, detect a first touch operation acting on the motion control, and control the virtual character to move in the game scene according to a movement of a touch point of the first touch operation;

a second control element, configured to provide an orientation control area on the graphical user interface, detect a second touch operation acting on the orientation control area, and adjust an orientation of the virtual character in the game scene according to a movement of a touch point of the second touch operation; and a third control element, configured to provide a perspective control on the graphical user interface, detect a third touch operation acting on the perspective control, and adjust a presentation perspective of the game scene according to the third touch operation.

Specific details of various elements in the above embodiment have been described in detail in the corresponding information processing method. In addition, the information processing apparatus further includes other elements corresponding to those in the information processing method. Therefore, detail descriptions are omitted herein.

It should be noted that although several components or elements of the device for action execution are mentioned in the above detailed description, such division is not mandatory. In fact, according to the implementation manners of the present disclosure, the features and functions of two or more components or elements described above may be embodied in one component or element. Conversely, the features and functions of one component or element described above may be further divided into multiple components or elements and embodied.

In an exemplary embodiment of the present disclosure, a computer-readable storage medium is also provided, on which at least one computer program is stored, and the at least one computer program is executed by at least one processor to implement the above information processing method.

The computer-readable storage medium may include a data signal that is propagated in a baseband or as part of a carrier, carrying readable program code. Such propagated data signals may take a variety of forms including, but not limited to, electromagnetic signals, optical signals, or any suitable combination of the foregoing. The computer-readable storage medium may send, propagate, or transmit a program for use by or in connection with an instruction execution system, apparatus, or device.

Program codes included in the computer-readable storage medium may be transmitted by any suitable medium, including but not limited to wireless, wire, optical cable, radio frequency, etc., or any suitable combination of the foregoing.

In an exemplary embodiment of the present disclosure, an electronic device is also provided. The electronic device may implement functions of a terminal, and the electronic device includes: a processing component and a display apparatus, which may further include at least one processor, and a memory resource represented by a memory and configured to store at least one instruction executable by the processing component, such as at least one application program. The at least one application program stored in the memory may include one or more components each corresponding to a set of instructions. In addition, the processing component is configured to execute instructions to perform the above-described information processing method.

The electronic device may also include: a power supply component, configured to perform power management on the electronic device; a wired or wireless network interface, configured to connect the electronic device to a network; and an input output (I/O) interface. The electronic device may operate based on an operating system stored in the memory, such as Android, iOS, Windows, Mac OS X, Unix, Linux, FreeBSD, or the like.

Through the description of the above implementation manner, those skilled in the art will readily understand that the example implementation manners described herein may be implemented by software or by software in combination with necessary hardware. Therefore, the technical solution according to the embodiment of the present disclosure may be embodied in the form of a software product, which may be stored in a non-volatile storage medium (which may be a CD-ROM, a USB flash drive, a mobile hard disk, etc.) or on a network. A number of instructions are included to cause a computing device (which may be a personal computer, server, electronic device, or network device, etc.) to perform a method in accordance with an embodiment of the present disclosure.

It should be noted that the specification and claims of the present disclosure and terms "first", "second", etc. in the foregoing drawings are used for distinguishing similar objects rather than describing a specific sequence or a precedence order. It will be appreciated that the terms used in such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

It should also be noted that various triggering events disclosed in the present specification may be preset, and different triggering events may trigger to execute different functions.

Other embodiments of the present disclosure will be apparent to those skilled in the art after considering the specification and practicing the present disclosure herein. The present application is intended to cover any variations, uses, or adaptations of the present disclosure, which are in accordance with the general principles of the present disclosure and include common general knowledge or related technical means in the art that are not disclosed in the present disclosure. The specification and examples are to be regarded as illustrative, and the true scope and spirit of the present disclosure are pointed out by the claims.

It is to be understood that the present disclosure is not limited to the accurate structure that have been described and shown in the drawings, and may make various modifications and variations without departing the scope thereof. The scope of the present disclosure is limited by the appended claims.

What is claimed is:

1. An information processing method, applied to a mobile terminal having at least one processor for executing a software application and a touch screen which is rendered with and a graphical user interface, contents rendered on the graphical user interface at least partially comprising a game scene and a virtual character, the method comprising:
providing a motion control on the graphical user interface; detecting a first touch operation acting on the motion control, and controlling the virtual character to move in the game scene according to a movement of a touch point of the first touch operation;
providing an orientation control area on the graphical user interface; detecting a second touch operation acting on the orientation control area, and adjusting an orientation of the virtual character in the game scene according to a movement of a touch point of the second touch operation; and
providing a perspective control on the graphical user interface, detecting a third touch operation acting on the perspective control, and adjusting a presentation view of the game scene according to the third touch operation.

2. The method as claimed in claim 1, wherein providing the perspective control on the graphical user interface comprises one of the following:
fixedly displaying the perspective control within a preset area on the graphical user interface; and
displaying, when detecting a perspective adjustment triggering event, the perspective control on the graphical user interface.

3. The method as claimed in claim 1, wherein adjusting the presentation view of the game scene according to the third touch operation comprises:
adjusting an orientation of a virtual camera corresponding to the presentation view according to the third touch operation; and
determining the presentation view of the game scene according to the orientation of the virtual camera.

4. The method as claimed in claim 3, wherein adjusting the orientation of the virtual camera corresponding to the presentation view according to the third touch operation comprises:
acquiring a current position of a touch point of the third touch operation;
determining a vector between the current position and an origin position of the perspective control; and
adjusting a rotation angle of the virtual camera corresponding to the presentation view according to the vector, so as to determine the orientation of the virtual camera.

5. The method as claimed in claim 1, wherein after adjusting the presentation view of the game scene according to the third touch operation, the method further comprises:
before detecting an end triggering event of the third touch operation, detecting whether a virtual target exists at a preset position, for displaying the presentation view of the game scene, of the graphical user interface in real time;
when the virtual target exists at the preset position, providing at least one interaction control within a preset area on the graphical user interface according to a preset type of the virtual target, the at least one interaction control comprising at least one preset instruction; and
when detecting a fourth touch operation acting on the at least one interaction control, sending, according to an interaction control selected by the fourth touch operation, instruction prompt information corresponding to the selected interaction control.

6. The method as claimed in claim 5, wherein sending, according to the interaction control selected by the fourth touch operation, the instruction prompt information corresponding to the selected interaction control comprises:
acquiring current position information of the virtual target;
generating the instruction prompt information according to the current position information of the virtual target and an instruction corresponding to the selected interaction control; and
sending the instruction prompt information.

7. The method as claimed in claim 1, wherein after adjusting the presentation view of the game scene according to the third touch operation, the method further comprises:
when detecting an end triggering event of the third touch operation, controlling the presentation view to restore to a presentation view corresponding to a current orientation of the virtual character in the game scene.

8. An information processing apparatus, applied to a mobile terminal having at least one processor for executing a software application and a touch screen which is rendered with and a graphical user interface, contents rendered on the graphical user interface at least partially comprising a game scene and a virtual character, the apparatus comprising:
a first control element, configured to provide a motion control on the graphical user interface, detect a first touch operation acting on the motion control, and control the virtual character to move in the game scene according to a movement of a touch point of the first touch operation;
a second control element, configured to provide an orientation control area on the graphical user interface, detect a second touch operation acting on the orientation control area, and adjust an orientation of the virtual character in the game scene according to a movement of a touch point of the second touch operation; and
a third control element, configured to provide a perspective control on the graphical user interface, detect a third touch operation acting on the perspective control, and adjust a presentation view of the game scene according to the third touch operation.

9. An electronic device, comprising:
at least one processor; and
at least one memory, configured to store at least one executable instruction of the at least one processor,
wherein the at least one processor is configured to execute the information processing method as claimed in claim 1 by executing the at least one executable instruction.

10. A computer-readable storage medium, on which at least one computer program is stored, wherein the at least one computer program is executed by at least one processor to implement the information processing method as claimed in claim 1.

11. The method as claimed in claim 1, wherein the graphical user interface further comprises a mini-map, wherein the mini-map is one of the followings: a thumbnail of an entire game scene, and a thumbnail of a local part of the game scene.

12. The method as claimed in claim 1, wherein the motion control is a visible control.

13. The method as claimed in claim 1, wherein the motion control is an invisible control.

14. The method as claimed in claim 1, wherein controlling the virtual character to move in the game scene comprises one of the following:
   controlling a moving direction of the virtual character in the game scene; and
   controlling a moving direction and a moving speed of the virtual character in the game scene.

15. The method as claimed in claim 1, wherein the orientation control area is a visible area.

16. The method as claimed in claim 1, wherein the orientation control area is an invisible area.

17. The method as claimed in claim 1, wherein the perspective control is a visible control.

18. The method as claimed in claim 1, wherein the perspective control is an invisible control.

19. The method as claimed in claim 1, wherein when adjusting the presentation view of the game scene, a position and orientation of the virtual character in the game scene are kept unchanged.

20. The method as claimed in claim 5, wherein the preset position is one of the following:
   a geometric center of the graphical user interface;
   a preset coordinate or area on the graphical user interface; and
   a position where a crosshair is located on the graphical user interface.

* * * * *